United States Patent [19]
Pellett

[11] 3,926,607
[45] Dec. 16, 1975

[54] METHOD FOR REFINING MOLTEN GLASS-MAKING MATERIALS

[75] Inventor: Fred G. Pellett, Maumee, Ohio

[73] Assignee: Owens-Illinois, Inc., Toledo, Ohio

[22] Filed: Feb. 10, 1975

[21] Appl. No.: 548,414

Related U.S. Application Data

[63] Continuation of Ser. No. 439,604, Feb. 4, 1974, abandoned.

[52] U.S. Cl. .................................. 65/136; 65/180
[51] Int. Cl.[2] ........................................ C03B 5/18
[58] Field of Search ............ 65/134, 135, 136, 180, 65/331

[56] References Cited
UNITED STATES PATENTS

| | | | |
|---|---|---|---|
| 2,969,614 | 1/1961 | Stewart | 65/180 |
| 3,244,493 | 4/1966 | Cala | 65/135 X |
| 3,419,373 | 12/1968 | Gould et al. | 65/180 |
| 3,819,350 | 6/1974 | Pellett et al. | 65/134 |

*Primary Examiner*—Arthur D. Kellogg
*Attorney, Agent, or Firm*—D. T. Innis; E. J. Holler

[57] ABSTRACT

A method for removing gaseous inclusions from molten glass materials to provide a refined, molten glass. Cylindrical tubes, positioned concentrically about a common vertical axis of rotation, form an annulus for the passage of molten glass. One tube is then rotated about the common axis relative to the other tube, molten glass-making materials are introduced into the annulus formed by the tubes and pass downward between the walls of the tube; the motion of the rotating tube induces shearing action in the glass. The induced shearing action facilitates removal of gaseous inclusions which are formed when the glass-making materials are rapidly melted. The rate of downward flow and therefore the residence time during which the molten glass is subjected to the shearing action, temperature of the molten glass-forming materials and amount of shearing action are controlled independently in the process. Experiments have shown that controlling these factors at predetermined levels can achieve maximum refining rates.

2 Claims, 2 Drawing Figures

METHOD FOR REFINING MOLTEN GLASS-MAKING MATERIALS

This is a continuation of application Ser. No. 439,604, filed Feb. 4, 1974, now abandoned.

BACKGROUND OF THE INVENTION

1. Field of the Invention

This invention relates to a method and apparatus for removing gaseous inclusions from molten glass. Molten glass-forming materials are passed through an annulus formed by a cylindrical-shaped chamber having a cylinder-shaped stirrer positioned within the chamber. One cylinder is rotated thereby imparting a shearing action to the molten glass. The temperature of the glass, shear rate and flow rate can be controlled individually in this process but not in the prior art glass-making processes.

2. Description of the Prior Art

The prior art method of homogenizing molten glass-making materials is by introducing raw glass-making materials into a large tank; the materials are heated and brought to a molten state, additional glass-making materials may be added continuously to the molten glass pool and refined glass is removed continuously to maintain a pool of molten glass in the tank. Up to three hundred tons of molten glass-making materials may be subjected to a temperature in excess of 2400°F. for a period up to 30 hours to homogenize the glass-making materials and to remove gaseous inclusions.

SUMMARY OF THE INVENTION

This invention relates to a method and apparatus for refining molten glass-making materials to produce refined molten glass having both the numbers of gaseous inclusions and the distribution of sizes of gaseous inclusions changed. The apparatus comprises an outer chamber having a cylindrical configuration and a rotatable tube positioned in the chamber forming an annulus between the tube and the chamber. Molten glass is passed downward through the passage and subjected to shearing action to remove or reduce gaseous inclusions. The residence time of the molten glass within the passage, the temperature of the glass and the amount of shear induced are controlled during the processing using the apparatus of this invention; controlling these three factors also produces controlled viscosity and density of the glass.

DESCRIPTION OF THE PREFERRED EMBODIMENTS

Figure 1:
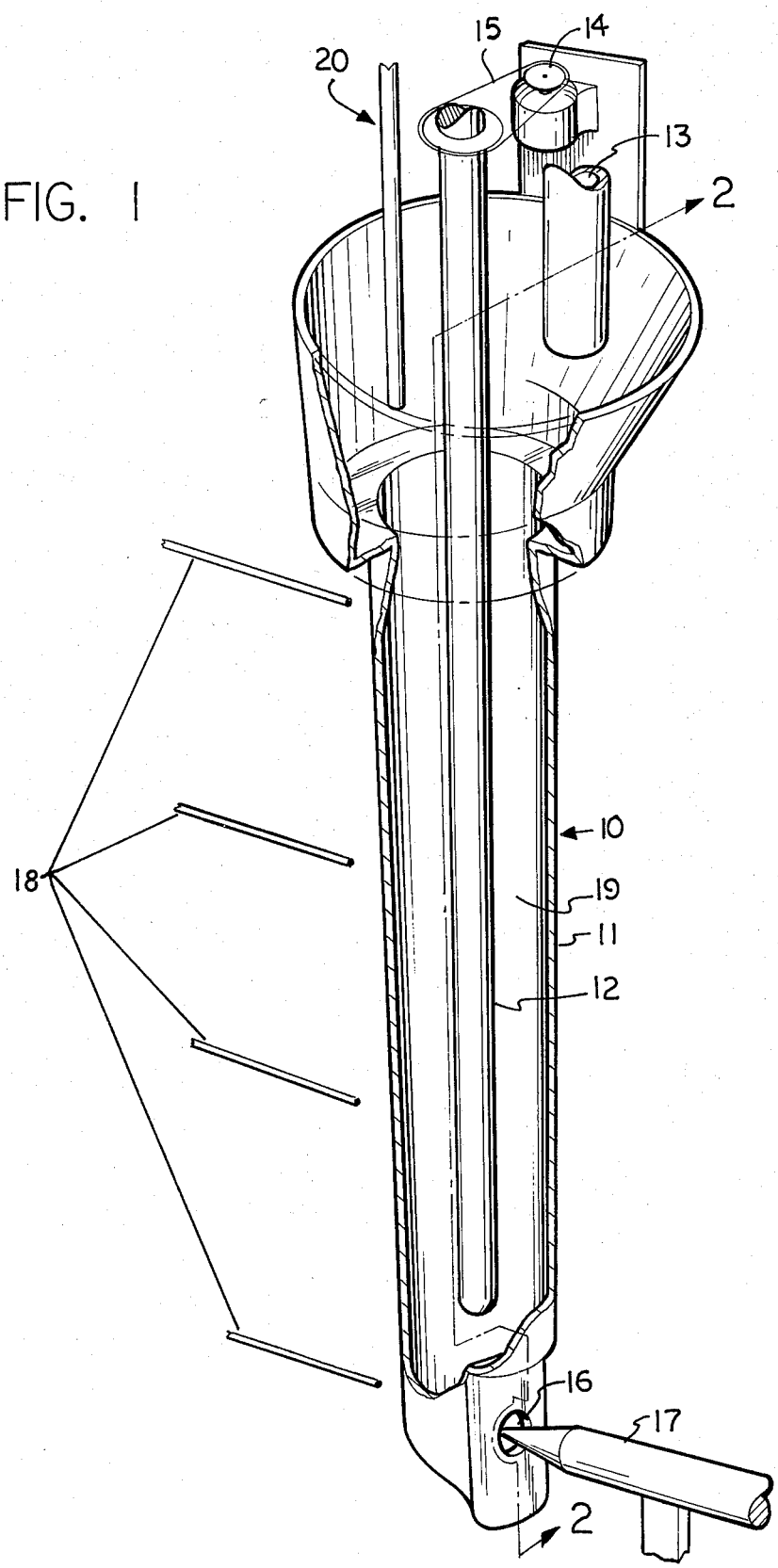
FIG. 1 shows the apparatus of one embodiment of the invention.
Figure 2:
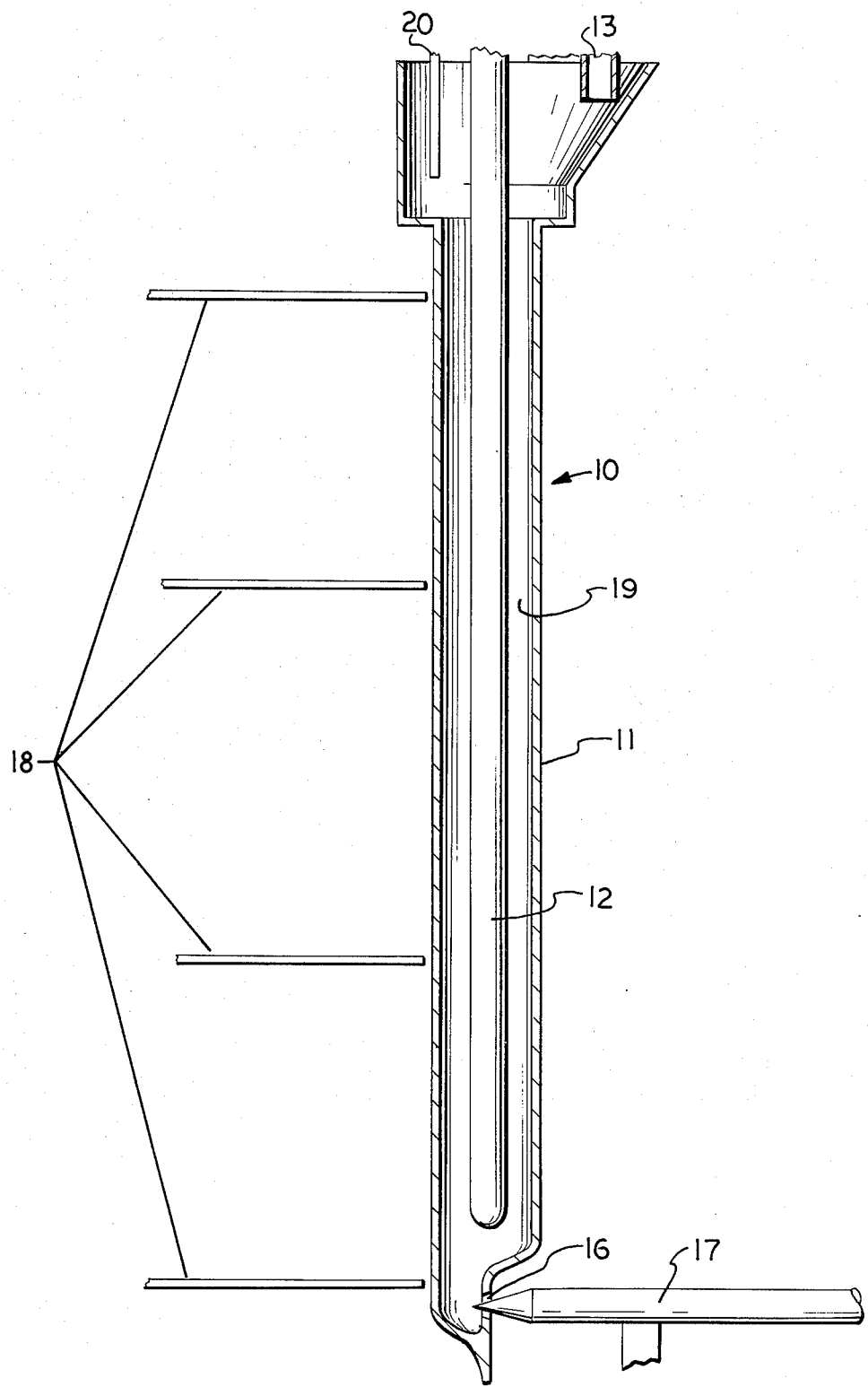
FIG. 2 is a cross-section of the apparatus of FIG. 1.

Referring to FIGS. 1 and 2, there is shown an apparatus for practicing the process of this invention. Apparatus 10 comprises a cylindrically-shaped outer chamber 11, a stirrer 12, inlet tube 13, drive motor 14, drive belt 15, the chamber has an outlet 16 and an outlet control valve 17, a plurality of temperature sensing devices 18, a level control 20 and the annulus formed between chamber 11 and stirrer 12 is designated 19.

FIG. 2 is a cross-section of the apparatus of FIG. 1 taken along lines 2—2.

In the practice of this invention, molten glass-making materials are introduced into the annulus 13 and flow downward and exit through the outlet 16 in a controlled manner. The rotating stirrer induces shear and both removes gaseous inclusions and also changes the size distribution of the inclusions.

The apparatus and method of this invention facilitates the "coarsening" of gaseous inclusions in the molten glass. The removal of the gaseous inclusions in this process of this invention relies upon "bubble" coarsening and subsequent rapid bubble migration from the molten glass due to the effect of the Stokes law rise.

A pre-melting apparatus converted a standard soda-lime-silica glass-forming batch material into a molten glass which is free of thicker cords but has gaseous inclusions. This unrefined molten glass was then introduced into the passage between the concentric tubes and subjected to a shearing action which greatly enhances the coarsening of gaseous inclusions in the glass, which then flow upward in a direction opposite to the downward flow of the molten glass. The efficient operation of the bubble removing process depends upon "coarsening" the smaller bubbles and facilitating the removal of the enlarged bubbles by upward migration. The rate of migration is determined by glass temperature, the downward vertical velocity of the molten glass, residence time in the apparatus and the total induced shear rate.

A suitable batch mixture was prepared in a premelter and delivered from the pre-melter to the refining section. The batch mixture comprised 100 grams of calcium oxide (COa); 523 grams of powdered flint; and 223 grams of sodium hydroxide (Na)H); and 70 grams of distilled water.

The glass is brought rapidly to its molten state.

A chemical analysis of samples of glass produced the following average composition:

| | |
|---|---|
| $SiO_2$ | 73.42 wt. percent |
| CaO | 13.62 wt. percent |
| $Na_2O$ | 12.34 wt. percent |

The remaining constituents included less than 1% each of $Al_2O_3$, MgO, $K_2O$, $SO_3$ and $Cl_2$. The molten glass was supplied to the refining apparatus and the temperature was varied between 2,550°F. and 2700°F.

The flow rate varied between 60 and 150 grams per hour and the number of revolutions per minute of the stirrer varied from 10–810. The molten refined homogenized glass was collected at the outlet and evaluated in terms of count and size distribution of bubbles. Bubble count was done by a count of bubbles in a known amount of glass and the result expressed as the number of bubbles per gram of glass. The runs demonstrated that in this process there is a reproducible relationship between the input variables which can be controlled and measured (namely, temperature, shear rate, and flow rate) and the number and size distriubtion of bubbles in the output molten glass.

Table 1 details the results of 15 experimental runs.

TABLE I

RESULTS of 15 RUNS
Seed Counts Per Gram of Glass
Reported Observations

| Temp.°F. | Flow Grams/Hr. | Stir RPM | 1 | 2 | 3 | 4 | 5 | Average Observed Count |
|---|---|---|---|---|---|---|---|---|
| 2550 | 60 | 30 | .707 | .297 | .875 | 1.52 | .75 | 0.830 |
| 2550 | 60 | 270 | 11.3 | 16.2 | 13.1 | 12.4 | 8.8 | 12.4 |
| 2550 | 120 | 30 | 2.49 | 2.29 | 1.27 | 1.26 | 2.16 | 1.89 |
| 2550 | 120 | 270 | 157. | 184. | 192. | 178. | 178. | 178. |
| 2650 | 60 | 30 | 2.53 | 3.13 | 1.41 | 1.65 | 2.50 | 2.24 |
| 2650 | 60 | 270 | .313 | 1.83 | 1.08 | 1.05 | 1.22 | 1.10 |
| 2650 | 120 | 30 | .228 | .485 | .298 | .517 | .628 | .430 |
| 2650 | 120 | 270 | 23.7 | 27. | 46.2 | 43. | 50.6 | 38.1 |
| 2600 | 90 | 90 | .905 | 1.21 | 1.24 | .843 | 1.05 | 1.05 |
| 2600 | 90 | 10 | 1.52 | 1.24 | 1.30 | 2.01 | 1.93 | 1.80 |
| 2600 | 90 | 810 | 36.5 | 72.2 | 136. | 165. | 100. | 102. |
| 2600 | 30 | 90 | 1.11 | 1.53 | 1.81 | 1.87 | 1.45 | 1.55 |
| 2600 | 150 | 90 | 14.9 | 22.6 | 25.2 | 33.2 | 33.0 | 25.8 |
| 2500 | 90 | 90 | 34.5 | 37.5 | 43.0 | 44.0 | 39.8 | 39.8 |
| 2700 | 90 | 90 | 3.09 | 5.61 | 4.36 | 2.71 | 4.19 | 3.99 |

I claim:

1. A method of refining molten glassmaking materials comprising the steps of: forming a passage between a cylindrically shaped surface and a tubular stirring device of about the same length as the cylindrically shaped surface; introducing molten glass containing gaseous inclusions into the passage and downwardly passing the molten glass between the tubular surfaces; rotating at least one of the cylindrical surfaces at a speed of between 30 and 810 revolutions per minute; maintaining the glass temperature between 2550°F and 2700°F; controlling the residence time of molten glass in the annulus to an equivalent flow rate between 60 and 150 grams of molten glass per hour and thereby causing gaseous inclusions to coalesce and to flow upwardly in a direction opposite to the downward flow of molten glass-forming material in the passage; and discharging molten glass having a controlled number of gaseous inclusions.

2. The method of claim 1 wherein the introduction into and the removal of molten glass from the annulus is substantially continuous.

* * * * *